United States Patent
Suzuki et al.

(10) Patent No.: US 8,548,200 B2
(45) Date of Patent: Oct. 1, 2013

(54) LANE-MARKER RECOGNITION SYSTEM WITH IMPROVED RECOGNITION-PERFORMANCE

(75) Inventors: Shunsuke Suzuki, Anjo (JP); Naoki Kawasaki, Kariya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 214 days.

(21) Appl. No.: 12/931,766

(22) Filed: Feb. 10, 2011

(65) Prior Publication Data

US 2011/0200258 A1 Aug. 18, 2011

(30) Foreign Application Priority Data

Feb. 12, 2010 (JP) ................................. 2010-028913

(51) Int. Cl.
*G06K 9/00* (2006.01)
(52) U.S. Cl.
USPC ........................................ 382/104
(58) Field of Classification Search
USPC .......... 382/100–107; 340/907–910, 933–937
See application file for complete search history.

(56) References Cited

U.S. PATENT DOCUMENTS

2003/0103649 A1 6/2003 Shimakage

FOREIGN PATENT DOCUMENTS

| JP | 5-327000 | 12/1993 |
|----|----------|---------|
| JP | 5-347000 | 12/1993 |
| JP | 2003-168104 | 6/2003 |
| JP | 2003-196786 | 7/2003 |
| JP | 2005-157670 | 6/2005 |
| JP | 2005-346197 | 12/2005 |
| JP | 2007-189432 | 7/2007 |
| JP | 2009-96274 | 5/2009 |

OTHER PUBLICATIONS

Office action dated Jan. 10, 2012 in corresponding Japanese Application No. 2010-028913.

*Primary Examiner* — Atiba O Fitzpatrick
(74) *Attorney, Agent, or Firm* — Harness, Dickey & Pierce, PLC (57) ABSTRACT

In a lane-marker recognition system installed in a vehicle, an image pickup unit picks up an image of a target region including a road ahead of the vehicle, and a light-intensity detecting unit detects a change in a light intensity of the target region in the picked-up image. A lane-marker recognizing unit compares the change in the light intensity of the target region in the picked-up image with a predetermined threshold value, and recognizes a region of at least one lane marker in the target region based on a result of the comparison, the at least one lane marker being formed on the road. A re-determining unit re-determines the threshold value based on a light intensity of the recognized region of the at least one lane marker.

8 Claims, 8 Drawing Sheets

LANE-MARKER RECOGNITION SYSTEM WITH IMPROVED RECOGNITION-PERFORMANCE

CROSS REFERENCE TO RELATED APPLICATIONS

This application is based on Japanese Patent Application 2010-28913 filed on Feb. 12, 2010. This application claims the benefit of priority from the Japanese Patent Application, so that the descriptions of which are all incorporated herein by reference.

TECHNICAL FIELD

The present disclosure relates to lane-marker recognition systems to be installed in motor vehicles, and more particularly, to such lane-marker recognition systems having an improved recognition-performance in comparison to that of conventional white-line recognition systems.

BACKGROUND

Lane markers, such as painted lane boundary markers (white lines) and raised markers, formed on a road work to divide the road into plural parts as lanes. Thus, in order to improve the running safety of motor vehicles, it is important for the motor vehicles in running one lane of a road ahead thereof to accurately recognize the lane markers formed on the road.

In view of the circumstances, white-line recognition systems are installed in motor vehicles. Such a white-line recognition system installed in a motor vehicle picks up an image of a region including a road ahead of the motor vehicle, and recognizes white lines (lane markers) marked on the road based on the picked-up image. One of these white-line recognition systems is disclosed in Japanese Patent Application Publication No. 2005-157670.

As one specific method for recognizing white lines marked on a road in front of a motor vehicle based on a picked-up image of a region including the road, the following recognition method is normally used. Specifically, the recognition method extracts values of light intensity (luminance) in an area of the picked-up image; this area corresponds to the region including the road. Then, the recognition method compares the values of light intensity with a preset threshold value, and recognizes white lines marked on the road based on a result of the comparison.

SUMMARY

The inventors have discovered that there is a point that should be improved in the recognition method.

Specifically, the recognition accuracy of white lines in the recognition method set forth above is greatly associated with the accuracy of setting the threshold value.

From this viewpoint, the Patent Publication No. 2005-157670 for example discloses a method of setting a threshold value based on values of light intensity in an area of a picked-up image; this area corresponds to a road. However, the threshold value depends on values of light intensity in areas of the picked-up image; these areas correspond to white lines marked on the road. The threshold value also depends on values of light intensity in an area of the picked-up image; this area corresponds to air above the road. The threshold value further depends on the amount of change in the values of light intensity in the area of the picked-up image; this area corresponds to the road.

That is, the values of light intensity in the areas, which correspond to the white lines, of the picked-up image, the values of light intensity in the area, which corresponds to the air above the road, of the picked-up image, and the amount of change in the values of light intensity in the area, which corresponds to the road, of the picked-up image vary depending on the state of the white lines, the state of the road, the state (for example, the orientation) of light (sunlight and/or illumination light) to the road and its circumference, the weather condition around the road, and the like. Thus, using the method of merely setting the threshold value based on the values of light intensity in the area, which corresponds to the road, of the picked-up image in order to recognize white lines marked on the road may cause the white lines to be accurately recognized.

In view of the circumstances set forth above, the present disclosure seeks to provide lane-marker recognition systems installed in corresponding vehicles and designed to address the point that should be improved in the recognition method set forth above.

Specifically, an aspect of the present disclosure aims to provide such a lane-marker recognition system having an improved recognition performance of lane markers formed on a road ahead of the corresponding vehicle.

According to one aspect of the present disclosure, there is provided a lane-marker recognition system installed in a vehicle. The system includes an image pickup unit that picks up an image of a target region including a road ahead of the vehicle, and a light-intensity detecting unit that detects a change in a light intensity of the target region in the picked-up image. The system includes a lane-marker recognizing unit that compares the change in the light intensity of the target region in the picked-up image with a predetermined threshold value, and recognizes a region of at least one lane marker in the target region based on a result of the comparison. The at least one lane marker is formed on the road. The system includes a re-determining unit that re-determines the threshold value based on a light intensity of the recognized region of the at least one lane marker.

According to another aspect of the present disclosure, there is provided a lane-marker recognition system installed in a vehicle. The system includes an image pickup unit that picks up an image of a target region including a road ahead of the vehicle, and a light-intensity detecting unit that detects a change in a light intensity of the target region in the picked-up image. The system includes a lane-marker recognizing unit that compares the change in the light intensity of the target region in the picked-up image with a predetermined threshold value, and recognizes a region of at least one lane marker in the target region based on a result of the comparison, the at least one lane marker being formed on the road. The system includes an intensity ratio calculating unit that calculates a ratio of a light intensity of a first area in the picked-up image to a light intensity of a second area in the picked-up image, the first area corresponding to the part of air, the second area corresponding to a part of the road ahead of the vehicle. The system includes a threshold correcting unit that compares the calculated ratio with a preset first value, and corrects the threshold value by reducing the threshold if the calculated ratio is equal to or higher than the preset first value.

According to a further aspect of the present disclosure, there is provided a lane-marker recognition system installed in a vehicle. The system includes an image pickup unit that picks up an image of a target region including a road ahead of the vehicle, and a light-intensity detecting unit that detects a change in a light intensity of the target region in the picked-up image. The system includes a lane-marker recognizing unit that compares the change in the light intensity of the target region in the picked-up image with a predetermined threshold value, and recognizes a region of at least one lane marker in the target region based on a result of the comparison, the at least one lane marker being formed on the road. The system includes an intensity distribution calculating unit that calculates a value of a parameter indicative of a magnitude of variations in a light-intensity distribution of the road ahead of the vehicle in the image picked up by the image pickup unit. The system includes a threshold correcting unit that compares the calculated value of the parameter with a first preset value, and corrects the threshold value by increasing the threshold value if the calculated value of the parameter is equal to or higher than the preset first value.

According to a still further aspect of the present disclosure, there is provided a computer program product. The computer program product includes a computer usable medium; and a set of computer program instructions embodied on the computer useable medium. The set of computer program instructions includes instructions to: capture an image of a target region including a road ahead of a vehicle picked up by an image pickup unit; detect a change in a light intensity of the target region based on the picked up image; compare the change in the light intensity of the target region with a predetermined threshold value to recognize a region of at least one lane marker in the target region based on a result of the comparison, the at least one lane marker being formed on the road; and re-determine the threshold value based on a light intensity of the recognized region of the at least one lane marker.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which.

(a) of FIG. 4 is a view schematically illustrating an example of a current frame image, which has a relatively low value of a parameter indicative of a magnitude of variations in a light-intensity distribution thereof according to the first embodiment.

(b) of FIG. 4 is a view schematically illustrating intensity values of pixels located on a scan line in the current frame image illustrated in (a) of FIG. 4.

(c) of FIG. 4 is an example of a current frame image, which has a relatively high value of the parameter indicative of the magnitude of variations in the light-intensity distribution thereof according to the first embodiment.

(d) of FIG. 4 is a view schematically illustrating intensity values of pixels located on a scan line in the current frame image illustrated in (c) of FIG. 4.

(a) of FIG. 5 is a view schematically illustrating an example of a distribution curve of pixel values of all pixels on a target scan line according to the first embodiment.

(b) of FIG. 5 is a view schematically illustrating an example of a distribution curve of differential values of the pixel values of all pixels on the target scan line according to the first embodiment.

(c) of FIG. 5 is a view schematically illustrating an example of a distribution curve of absolute values of the differential values of the pixel values of all pixels on the target scan line according to the first embodiment.

DETAILED DESCRIPTION OF EMBODIMENTS

Embodiments of the present disclosure will be described hereinafter with reference to the accompanying drawings. In the drawings, identical reference characters are utilized to identify identical corresponding components.

First Embodiment

In the first embodiment, one aspect of the present disclosure is applied to a lane-marker recognition system 1 installed in a motor vehicle MV.

Note that, in the specification, "lane markers" mean markers, such as painted lines (white or orange solid/dashed lines) and raised markers, which are formed on a road and work to divide the road into plural parts as lanes.

Figure 1:
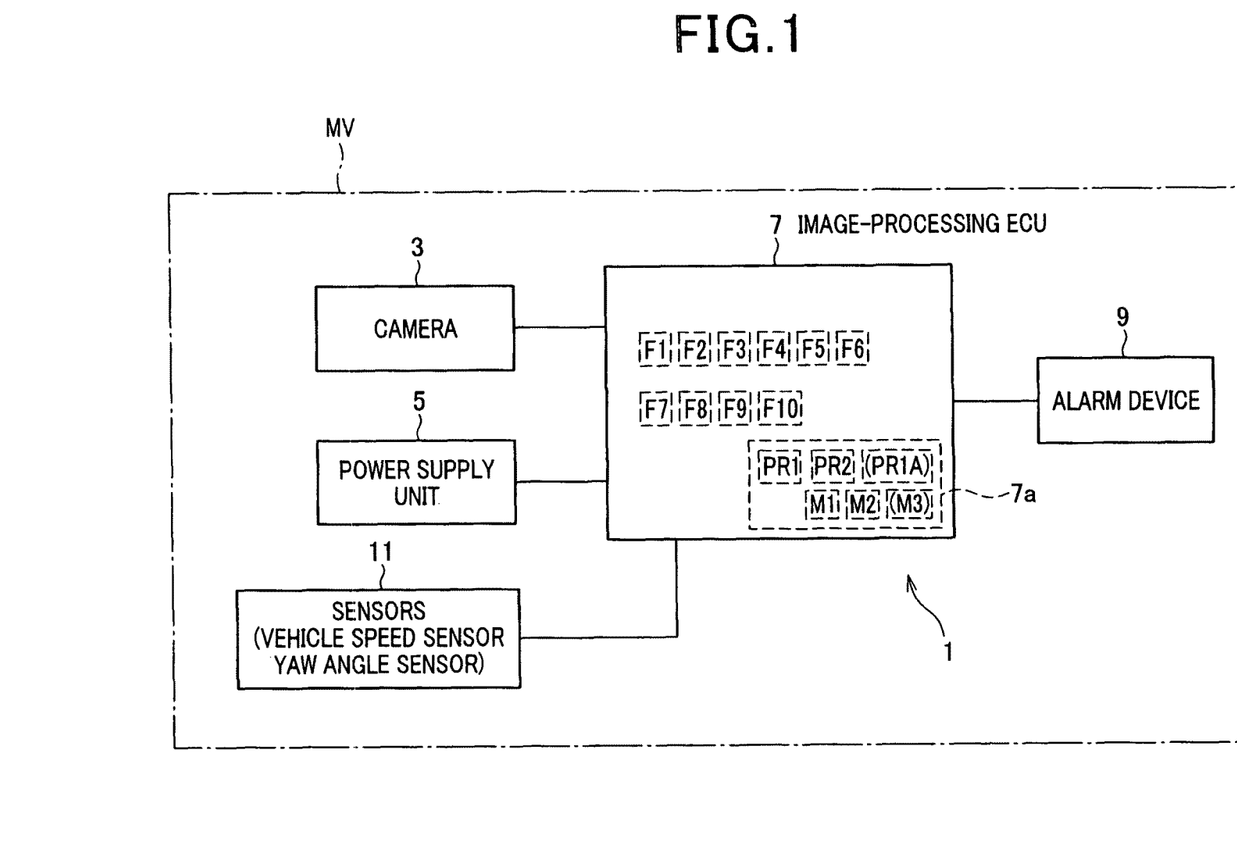
FIG. 1 is a block diagram schematically illustrating an example of the overall hardware structure of a lane-marker recognition system installed in a motor vehicle according to a first embodiment of the present disclosure.

Referring to FIG. 1, the lane-marker recognition system 1 is comprised of a camera 3 as an example of image pickup means, a power supply unit 5, an image-processing ECU 7, and an alarm device 9, such as a buzzer. Each of the camera 3, power supply unit 5, and the alarm device 9 is communicably connected to the image-processing ECU 7. With the image-processing ECU 7, sensors 11 including a vehicle speed sensor and a yaw angle sensor are communicably connected.

The power supply unit 5 is, for example, a chargeable battery and operative to supply electric power to each of the camera 3, the image-processing ECU 7, and the alarm device 9 while an electric system of the motor vehicle MV including the lane-marker recognition system 1 is activated during an ignition switch (not shown) of the motor vehicle MV being on.

The camera 3 is, for example, a CCD camera, and mounted on a portion of the body (outer shell) of the motor vehicle at which the camera 3 can pick up images ahead of the motor vehicle MV. For example, the camera 3 is mounted on the front side of the body (outer shell) of the motor vehicle MV. The camera 3 has a field of view (an area that the camera 3 can pick up), and the field of view includes a predetermined target region on a road (road surface) ahead of the motor vehicle MV, and a part of air above the road. The target region includes a road ahead of the motor vehicle MV and a part of air above the motor vehicle MV.

The camera 3 is operative to pick up two-dimensional images (frame images) of the predetermined target region on a road ahead of the motor vehicle MV. The vertical direction and horizontal direction of each picked-up image correspond to the forward direction and the width direction of the vehicle, respectively.

Each picked-up image for example consists of a plurality of pixels arrayed in matrix; each of the pixels represents the light intensity (luminance) of a corresponding location thereof.

For example, the camera 3 is comprised of an optical system, a shutter, a CCD, an amplifier, an A/D converter, and a controller. The optical system includes a lens for collecting and focusing light, and an aperture as an opening with an adjustable size, which allows part of the light collected by the lens to pass therethrough to thereby control the amount of light to be picked up by the CCD. The shutter is designed to be openable and operative to control the time (exposure time) during which the light passing through the aperture reaches the CCD. That is, the opening speed (shutter speed) determines the time during which the light passing through the aperture reaches the CCD.

The CCD consists of a plurality of light-sensitive elements arrayed in matrix constituting a light sensitive pixel area; each of the light-sensitive elements corresponds to one pixel of an image to be picked up by the CCD.

When light is received by the light sensitive pixel area of the CCD, the received light is converted into an electric analog image (frame image) by the light-sensitive elements. The frame image is amplified by the amplifier using an adjustable gain, and the amplified frame image is converted into a digital frame image with, for example, 8-bit gray scale (256 levels of gray scale). Thus, the light intensity (luminance) of a frame image picked by each light-sensitive element of the CCD is converted into a value (pixel value, gray value, or intensity value) of a corresponding pixel of a digital frame image within the range from 0 to 255. The frame image can be converted into a digital frame image, and the digital frame image can be amplified using an adjustable gain.

The digital frame image is outputted from the camera 3 to the image-processing ECU 7. Thus, the camera 3 is configured to successively take frame images of the target region on a road ahead of the motor vehicle MV at a preset frame rate, and successively output digital frame images corresponding to the taken frame images to the image-processing ECU 7.

The controller of the camera 3 is operative to adjust the shutter speed, the gain, and the frame rate according to instructions sent from the image-processing ECU 7.

The image-processing ECU 7 is designed as, for example, a normal microcomputer circuit consisting of, for example, a CPU; a storage medium 7a including a ROM (Read Only Memory), such as a rewritable ROM, a RAM (Random Access Memory), and the like; an I/O (Input and output) interface; buses; and so on. The CPU, storage medium 7a, and the I/O interface are communicably connected with each other via the buses. The storage medium 7a stores therein beforehand various programs including a lane-marker recognition program PR1 and a lane departure determining program PR2.

The vehicle speed sensor 11 is operative to measure the speed of the motor vehicle MV and output, to the image-processing ECU 7, the measured speed of the motor vehicle MV. The yaw angle sensor 11 is operative to measure the yaw angle (the angle of deviation between the longitudinal axis of the motor vehicle MV and its true direction of motion) of the motor vehicle MV, and output, to the image-processing ECU 7, the measured yaw angle.

The image-processing ECU 7 is operative to output, to the controller of the camera 3, the instructions that causes the controller of the camera 3 to adjust the shutter speed, the frame rate, and the gain of the camera 3 so that the brightness (luminance) of frame images picked-up by the camera 3 is within a predetermined range.

In addition, the image-processing ECU 7 is designed to run the lane-marker recognition program PR1 using frame image data inputted from the camera 3 described later, thus recognizing (detecting) lane markers (lane boundary markers) formed on a road in front of the motor vehicle MV. In other words, the lane-marker recognition program PR1 causes the image-processing ECU 7 to function as a luminance detector F1, a lane-marker recognizer F2, a threshold re-determiner F3, a luminance-ratio calculator F4, a threshold corrector F5, and a luminance distribution calculator F6 described later.

The image-processing ECU 7 is also designed to run the lane departure determining program PR2 to thereby:

determine a lane on which the motor vehicle MV is running based on the recognized lane markers;

determine a distance of the motor vehicle MV to each of the recognized lane markers;

determine whether the motor vehicle MV will depart from the determined lane based on the determined distances, the measured speed of the motor vehicle MV, and the measured yaw angle; and output an alarm signal to the alarm device 9 when it is determined that the motor vehicle MV will depart from the determined lane.

In other words, the lane departure determining program PR2 causes the image-processing ECU 7 to function as a lane determiner F7, a distance determiner F8, a lane departure determiner F9, and an alarm signal output unit F10.

The alarm device 9 is equipped with a speaker and/or a display and operative to output, from the speaker, an audible alarm and/or output, on the display, a visible alarm (warning message); the audible alarm and the visible alarm, for example, prompt the driver of the motor vehicle MV to operate the steering wheel so as to prevent the lane departure.

Next, a lane-marker recognition task to be run by the image-processing ECU 7 in accordance with the lane-marker recognition program PR1 will be described hereinafter with reference to FIGS. 2 to 9. The lane-marker recognition program PR1 is launched so that the lane-marker recognition task is started when the ignition switch is turned on.

Figure 2:
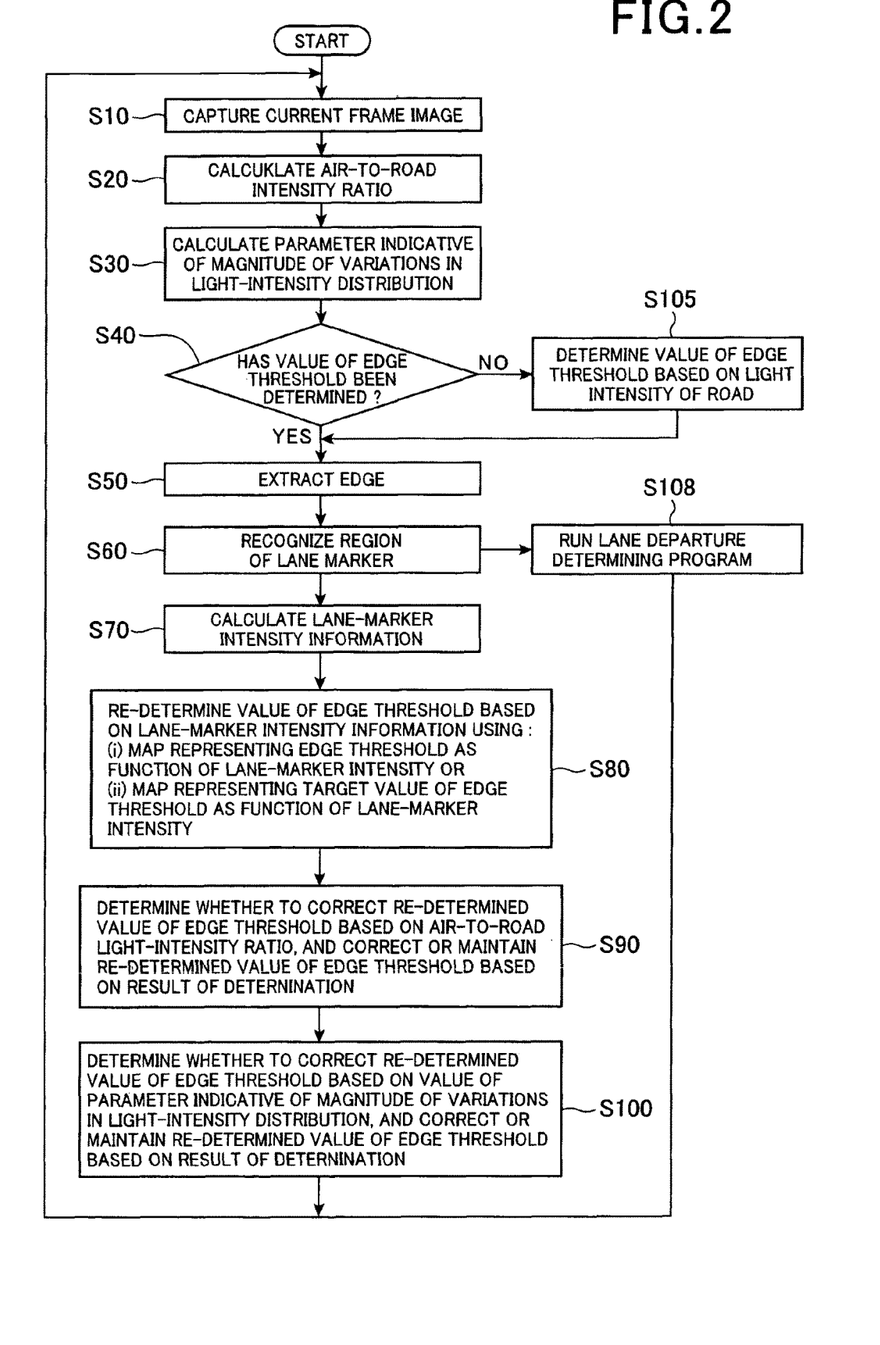
FIG. 2 is a flowchart schematically illustrating a lane-marker recognition task to be run by an image-processing ECU illustrated in FIG. 1 according to the first embodiment.
Figure 3A:
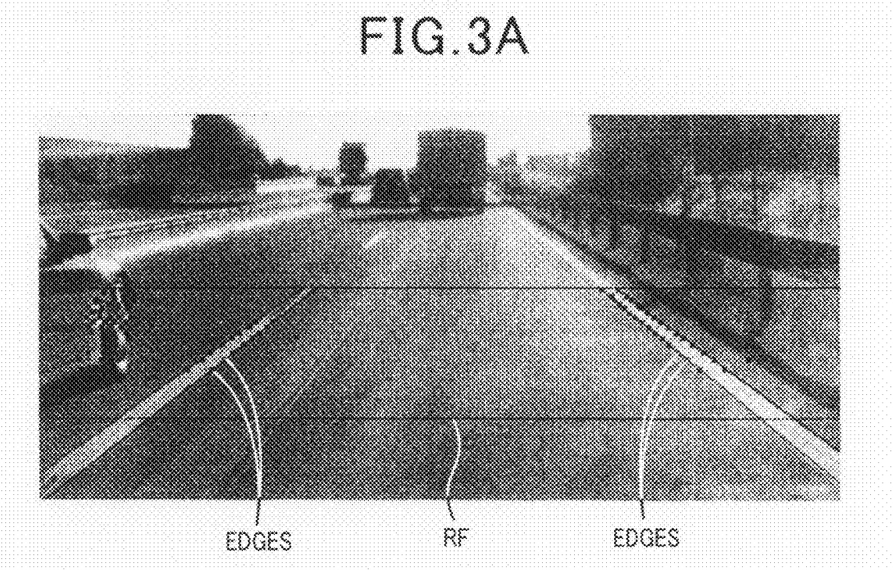
FIG. 3A is a view schematically illustrating an example of frame images picked up by a camera illustrated in FIG. 1 according to the first embodiment.

When launching the lane-marker recognition program PR1, the image-processing ECU 7, referred to simply as "ECU 7", captures a digital frame image as a current frame image picked up by the camera 3 and outputted therefrom in step S10. As described above, the target region to be taken by the camera 3 as frame images includes a road in front of the motor vehicle MV and a part of air above the motor vehicle MV. An example of frame images picked up by the camera 3 is illustrated in FIG. 3A.

Next, the ECU 7 calculates the ratio of the luminance (light intensity) of an area in the current frame image, referred to as an "air area", corresponding to the part of air to that of an area in the current frame image, referred to as a "road area" corresponding to a part of the road in front of the motor vehicle MV without including lane markers; the ratio will be referred to as an "air-to-road light-intensity ratio" in step S20.

For example, in step S20, the ECU 7 calculates the air-to-road intensity ratio in the following specific approach.

First, the ECU 7 takes the intensity value (pixel value) of each pixel of the air area in the current frame image, and regards the maximum intensity value in all pixels in the air area as a "value of light intensity of air".

Second, the ECU 7 takes the intensity value (pixel value) of each pixel of the road area in the current frame image; this road area is for example illustrated as an area enclosed by a rectangular frame RF. The ECU 7 arranges all pixels of the road area in the current frame image in descending order of their intensity values, and excludes pixels whose orders are within the highest order and a predetermined high order. This is because the pixels to be excluded may be pixels of areas corresponding to lane markers and/or noises so that their intensity values may be higher than the intensity values of the remaining pixels of the road area without including lane markers.

Third, the ECU 7 calculates an average value of the intensity values of the remaining pixels of the road area as a "value of light intensity of road without including lane markers", referred to simply as a "value of light intensity of road".

Fourth, the ECU 7 calculates the ratio of the value of the light intensity of air to the value of the light intensity of road as the air-to-road intensity ratio.

After completion of the calculation of the air-to-road intensity ratio, the ECU 7 calculates a parameter indicative of the magnitude of variations in a light-intensity distribution of the current frame image in step S30

For example, in step S30, the ECU 7 calculates the parameter indicative of the magnitude of variations in a light-intensity distribution in the road ahead of the motor vehicle in the following specific approach.

Figure 4:
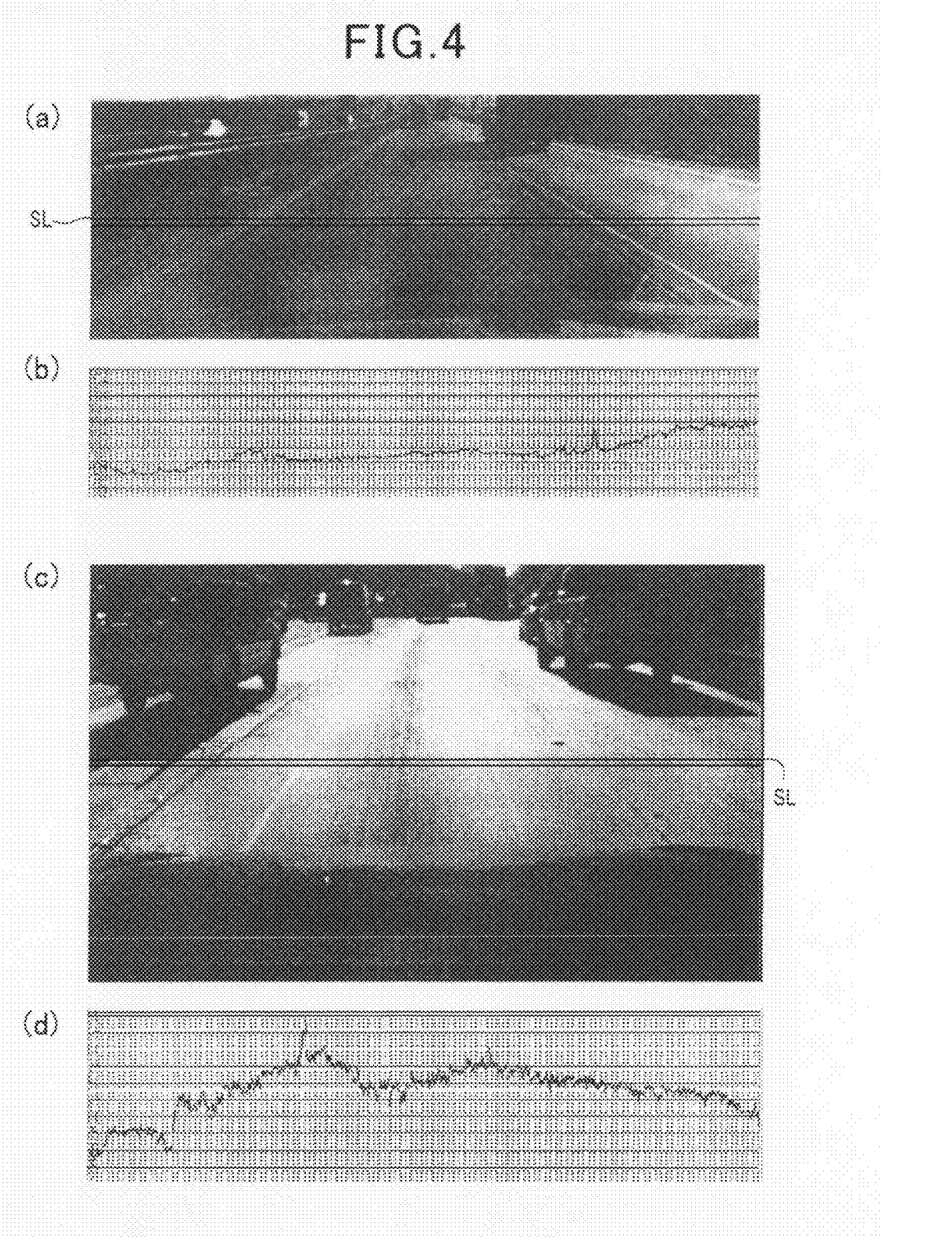

First, as illustrated in (a) and (c) of FIG. 4, the ECU 7 establishes a scan line SL on the road area of the current frame image in the horizontal direction. Then, the ECU 7 gets the intensity values of pixels located on the scan line SL in the current frame image. (b) of FIG. 4 represents the intensity values of the pixels located on the scan line SL in an example of the current frame image illustrated in (a) of FIG. 4, and (d) of FIG. 4 represents the intensity values of the pixels located on the scan line SL in an example of the current frame image illustrated in (c) of FIG. 4. Note that the horizontal direction of each of (b) and (d) of FIG. 4 represents positions of the pixels on the scan line SL in the horizontal direction, and the vertical direction thereof represents intensity values of the pixels on the scan line SL in the horizontal direction.

Second, the ECU 7 calculates an amount of change in the intensity value of each pixel on the scan line SL with respect to its adjacent pixel in a specific direction (right direction or left direction), calculates an absolute value of the amount of change in the intensity value of each pixel, and calculates the sum of the absolute values of the individual pixels on the scan line SL as the parameter indicative of the magnitude of variations in the light-intensity distribution of the current frame image. Note that (a) of FIG. 4 is an example of the current frame image, which has a relatively low value of the parameter indicative of the magnitude of variations in the light-intensity distribution thereof, and (c) of FIG. 4 is an example of the current frame image, which has a relatively high value of the parameter indicative of the magnitude of variations in the light-intensity distribution thereof.

Following the operation in step S30, the ECU 7 determines whether a value of an edge threshold has been determined to be stored in the storage medium 7a in step S40. The edge threshold is a parameter designed to be determined in step S80 and/or corrected in step S90 or S100 described later.

Upon determining that a value of the edge threshold has not been determined to be stored in the storage medium 7a (NO in step S40), that is, the current frame image is the first frame image picked up by the camera 3 after the ignition switch is turned on, the ECU 7 proceeds to step S105.

In step S105, the ECU 7 determines a value of the edge threshold based on the light intensity of road calculated in step S20, going to step S50.

For example, the ECU 7 according to the first embodiment stores therein a map M1 designed as, for example, a data table, a program, and/or a formula; this map M1 represents a variable of the edge threshold as a desired function of a variable (parameter) of the light intensity of road. The function can have been determined based on data obtained by tests and/or simulations using the motor vehicle MV or its equivalent computer model.

Specifically, in step S105, the ECU 7 references the map M1 using the value of the light intensity of road calculated in step S20 as a key to thereby extract a value of the edge threshold corresponding to the calculated value of the light intensity of road. Then, the ECU 7 stores the determined value of the edge threshold in the storage medium 7a.

Otherwise, upon determining that a value of the edge threshold has been determined to be stored in the storage medium 7a (YES in step S40), the ECU 7 proceeds to step S50.

In step S50, the ECU 7 extracts edges of lane markers on the road ahead of the motor vehicle MV in the current frame image in, for example, the following specific approach.

First, the ECU 7 establishes a plurality of scan lines SL on the road area of the current frame image in the horizontal direction (see FIG. 3B), and calculates a distribution curve of differential values (changes) of the intensity values of all pixels on each of the plurality of scan lines SL.

Figure 5:
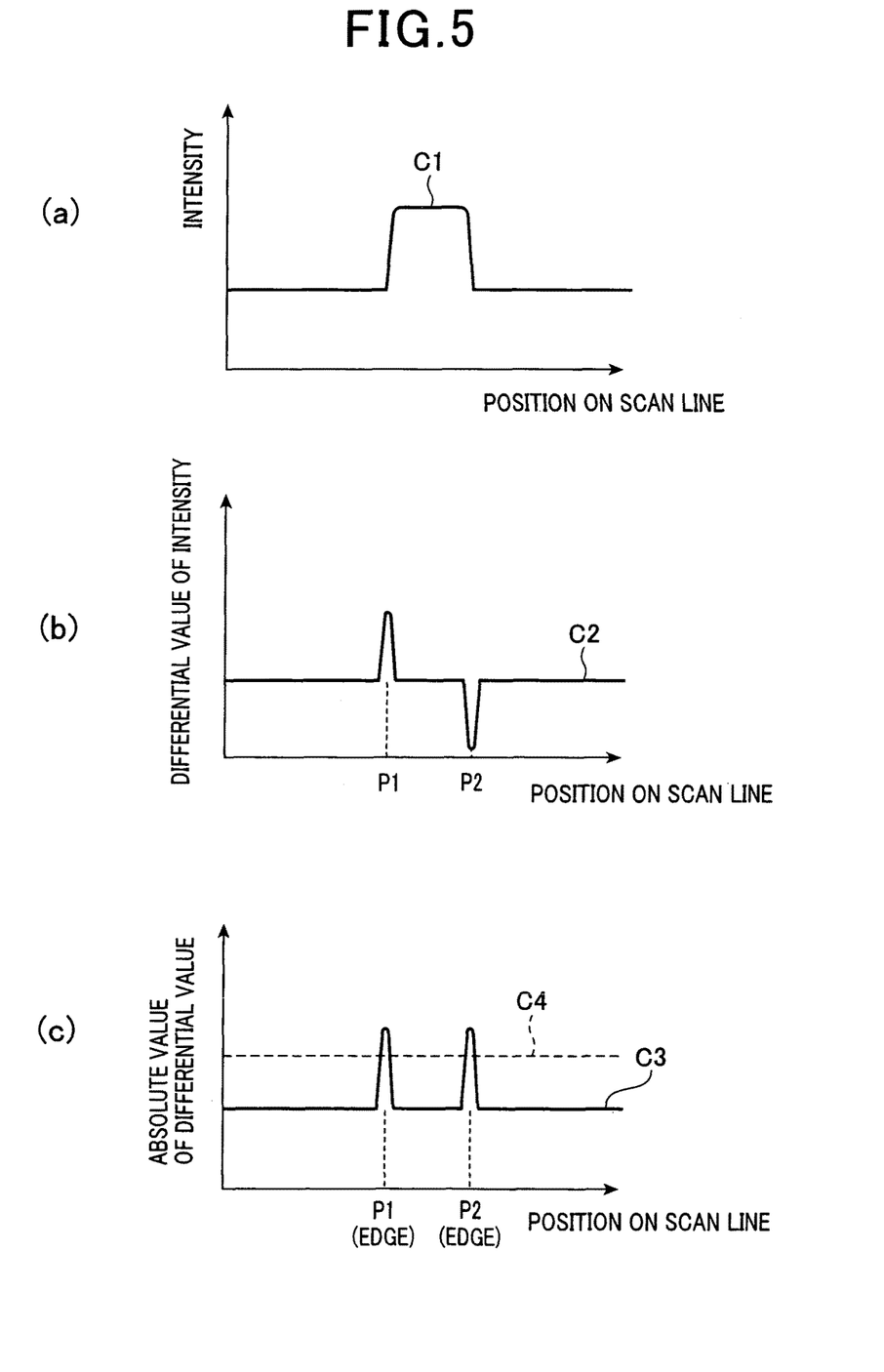

For example, an example of a distribution curve C1 of the pixel values of all pixels on a target scan line is illustrated in (a) of FIG. 5 whose horizontal axis represents a position (pixel) in the target scan line and whose vertical axis represents the pixel values. (a) of FIG. 5 shows that the intensity values of some pixels on the target scan line, which correspond to lane markers, such as white lines, are higher than those of the remaining intensity values of the remaining pixels on the target scan line; these remaining pixels correspond to the road area without including the lane markers.

When the distribution curve C1 of the pixel values of all pixels on the target scan line is illustrated in (a) of FIG. 5, a distribution curve C2 of the differential values of the pixel values of all pixels on the target scan line is obtained as illustrated in (b) of FIG. 5 whose horizontal axis represents a position (pixel) in the target scan line and whose vertical axis represents the differential values. As illustrated in (b) of FIG. 5, the distribution curve C2 includes a pair of a positive peak value at a position (pixel) P1 on the target scan line and a negative peak value at a position (pixel) P2 on the target scan line.

Second, the ECU 7 calculates a distribution curve of absolute values of the differential values of the intensity values of all pixels on each of the plurality of scan lines SL.

When the distribution curve C2 of the differential values of the pixel values of all pixels on the target scan line is illustrated in (b) of FIG. 5, a distribution curve C3 of the absolute values of the differential values of the pixel values of all pixels on the target scan line is obtained as illustrated in (c) of FIG. 5 whose horizontal axis represents a position (pixel) in the scan line and whose vertical axis represents the absolute values of the differential values. As illustrated in (c) of FIG. 5, the distribution curve C3 includes a pair of positive peak values at the respective positions (pixels) P1 and P2 on the target scan line.

Third, the ECU 7 calculates a distribution curve of the value of the edge threshold stored in the storage medium 7a for each of the scan lines; the value of the edge threshold for each of the plurality of scan lines is constant irrespective of the position on a corresponding one of the plurality of scan lines. For example, when the distribution curve C3 of the absolute values of the differential values of the pixel values of all pixels on the target scan line illustrated in (c) of FIG. 5, a distribution curve C4 of the value of the edge threshold for the target scan line is obtained as illustrated in (c) of FIG. 5.

Fourth, the ECU 7 overlays the distribution curve of the value of the edge threshold for each of the scan lines on the distribution curve of the absolute values of the differential values of the intensity values of all pixels on a corresponding one of the plurality of scan lines SL.

For example, when the distribution curve of the absolute values of the differential values of the intensity values of all pixels on the target scan line is illustrated in (c) of FIG. 5, the distribution curve of the value of the edge threshold is overlaid on the distribution curve of the absolute values of the differential values of the pixel values of all pixels on the target scan line (see (c) of FIG. 5).

Fifth, the ECU 7 extracts, as edges of lane markers, positions of pixels, which correspond to the paired positive peak values, on each of the plurality of scan lines SL if the paired peak values are higher than the distribution curve of the value of the edge threshold for a corresponding one of the scan lines SL. For example, as illustrated in (c) of FIG. 5, the ECU 7 extracts, as edges of a lane marker, the positions (pixels) P1 and P2, which correspond to the paired positive peak values on the target scan line and are higher than the distribution curve C4 of the value of the edge threshold for the target scan line.

Figure 3B:
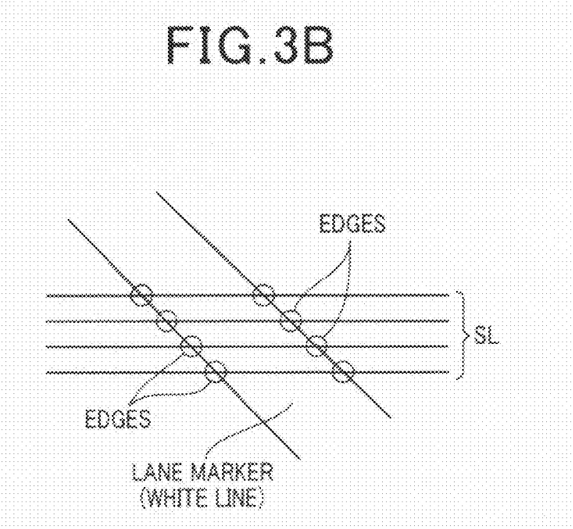
FIG. 3B is a view schematically illustrating an enlarged view of a part of a road area of the frame image illustrated in FIG. 3A, which shows a plurality of scan lines according to the first embodiment.

As a result of execution of the operation in step S50, edges of lane markers are extracted along the travelling direction of the motor vehicle MV. For example, FIGS. 3A and 3B show an example of the extracted edges.

Following the operation in step S50, the ECU 7 calculates at least one pair of lines, one of which is fitted to a first number of the extracted edges, and the other of which is fitted to a second number of the extracted edges; the first number of the extracted edges and the second number of the extracted edges are substantially aligned parallel to each other in the travelling direction of the motor vehicle MV in step S60. The lines of the at least one pair shows boundaries of at least one lane marker (white line). Thus, the ECU 7 recognizes at least one region (lane-marker region) surrounded by the lines of the at least one pair as a region of at least one lane marker (white line) in step S60.

As described above, the ECU 7 (or an alternative ECU connected to the ECU 7) runs the lane departure determining program PR2 based on the recognized at least one lane marker in step S108, going to step S10.

Next, the ECU 7 calculates an average value of the intensity values of pixels of the at least one lane marker region as lane-marker intensity information in step S70.

In step S80, the ECU 7 re-determines a value of the edge threshold based on the lane-marker intensity information calculated in step S70.

For example, as a first approach to re-determine a value of the edge threshold, the ECU 7 stores therein a map M2 designed as, for example, a data table, a program, and/or a formula; this map M2 represents a variable of the edge threshold as a desired function of a variable (parameter) of the lane-marker intensity information. The function can have been determined based on data obtained by tests and/or simulations using the motor vehicle MV or its equivalent computer model.

Specifically, in the first approach, the ECU 7 references the map M2 using a value of the lane-marker intensity information calculated in step S70 as a key to thereby extract a value of the edge threshold corresponding to the value of the lane-marker intensity information in step S80. Preferably, the map M2 is designed such that a value of the edge threshold is increased with increase in a corresponding value of the lane-marker intensity information. The map M2 is also preferably designed such that any edge of lane markers can be extracted without any noise being extracted.

As a second approach to re-determine a value of the edge threshold, the ECU 7 stores therein a map M3 designed as, for example, a data table, a program, and/or a formula; this map M3 represents a variable of a target value of the edge threshold as a desired function of a variable (parameter) of the lane-marker intensity information. The function can have been determined based on data obtained by tests and/or simulations using the motor vehicle MV or its equivalent computer model.

Specifically, in the second approach, the ECU 7 references the map M3 using a value of the lane-marker intensity information calculated in step S70 as a key to thereby extract a target value of the edge threshold corresponding to the value of the lane-marker intensity information in step S80.

Then, in step S80, the ECU 7 compares the value of the edge threshold stored in the storage medium 7a with the target value of the edge threshold.

If the target value of the edge threshold is higher than the value of the threshold stored in the storage medium 7a, the ECU 7 increments the value of the edge threshold stored in the storage medium 7a by a preset value $\Delta$ higher than 0, and re-determines the sum of the value of the edge threshold stored in the storage medium 7a and the preset value $\Delta$ as a new value of the edge threshold, updating the value of the edge threshold stored in the storage medium 7a to the new value (re-determined value) of the edge threshold in step S80.

Otherwise, if the target value of the edge threshold is lower than the value of the threshold stored in the storage medium 7a, the ECU 7 decrements the value of the edge threshold stored in the storage medium 7a by the preset value $\Delta$, and re-determines the decremented value of the edge threshold as a new value of the edge threshold, updating the value of the edge threshold stored in the storage medium 7a to the new value (re-determined value) of the edge threshold in step S80.

The second approach enables the edge threshold to change by only the preset value $\Delta$ to thereby prevent the edge threshold from changing rapidly. Thus, even if an improper value of the light-marker intensity information were determined, it would be possible to prevent the edge threshold from greatly departing from a proper range.

Note that a lower limit is previously set for the edge threshold, and therefore, in each of the first and second approaches, a value of the edge threshold can be changed without being equal to or lower than the lower limit.

Following the operation in step S80, the ECU 7 determines whether to correct the re-determined value of the edge threshold in step S80 based on the air-to-road light-intensity ratio calculated in step S20, and corrects or maintains the re-determined value of the edge threshold in step S80 upon determining to correct the re-determined value of the edge threshold based on a result of the determination in step S90.

Specifically, the ECU 7 compares the air-to-road light-intensity ratio calculated in step S20 with each of a first value A and a second value B that is lower than the first value A.

Figure 6:
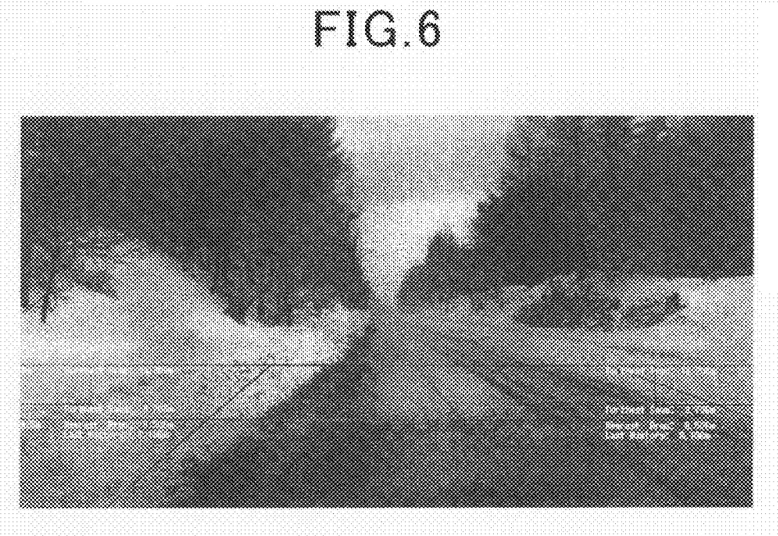
FIG. 6 is a view schematically illustrating an example of a current frame image of a snowy road ahead of a motor vehicle taken by the camera according to the first embodiment.

The second value B has been determined such that the range within which the air-to-road light-intensity ratio is equal to or lower than the second value B include a range of air-to-road light-intensity ratios expected if a current frame image of the road ahead of the motor vehicle MV, which is a snowy road, is taken by the camera 3 (see FIG. 6).

Figure 7:
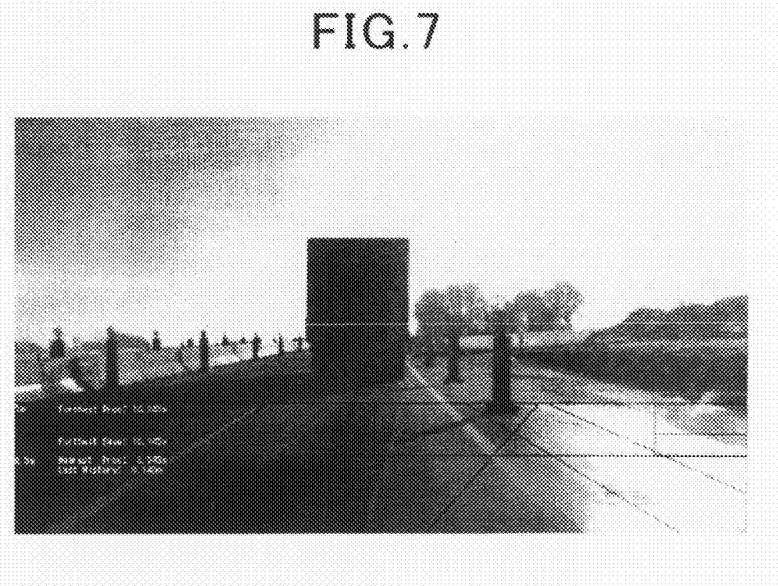
FIG. 7 is a view schematically illustrating an example of a current frame image of a road ahead of the motor vehicle, which is taken by the camera in a scene with severe backlight according to the first embodiment.

The first value A has been determined such that the range within which the air-to-road light-intensity ratio is equal to or higher than the first value A include a range of air-to-road light-intensity ratios expected if a current image frame is taken by the camera 3 in a scene with severe backlight (see FIG. 7).

Figure 8:
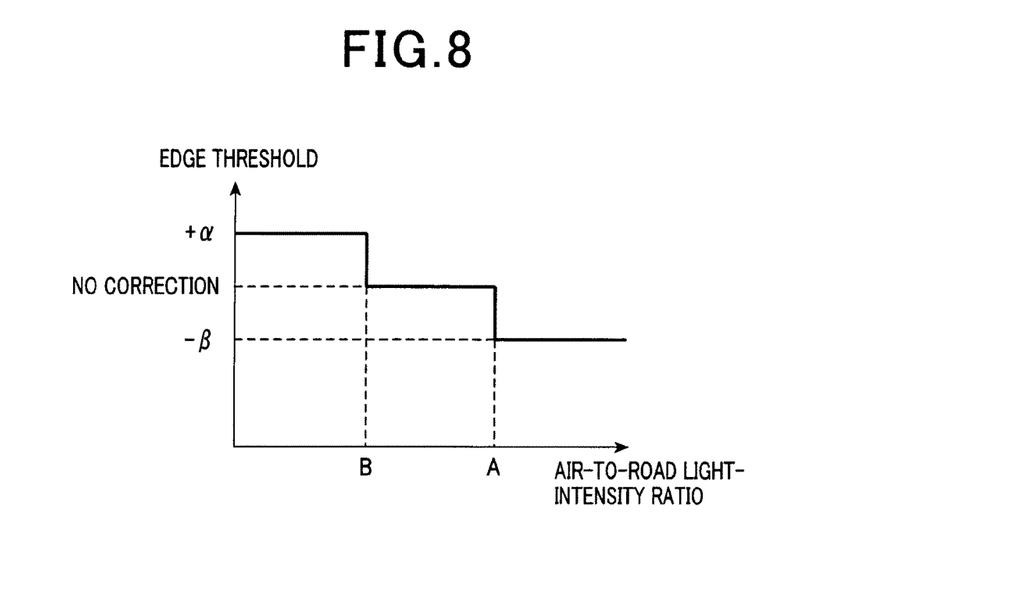
FIG. 8 is a view schematically illustrating how to correct a re-determined value of an edge threshold based on an air-to-road light-intensity ratio according to the first embodiment.

As a result of the comparison, if it is determined that the air-to-road light-intensity ratio calculated in step S20 is equal to or lower than the second value B, the ECU 7 corrects the re-determined value of the edge threshold in step S80 by incrementing it by a preset value α higher than zero, and updates the re-determined value of the edge threshold stored in the storage medium 7a to the corrected value of the edge threshold in step S90 (see FIG. 8).

Otherwise, if it is determined that the air-to-road light-intensity ratio calculated in step S20 is higher than the second value B and lower than the first value A, the ECU 7 maintains the re-determined value of the edge threshold in step S80 without correcting it in step S90 (see FIG. 8).

Otherwise, if it is determined that the air-to-road light-intensity ratio calculated in step S20 is equal to or higher than the first value A, the ECU 7 corrects the re-determined value of the edge threshold in step S80 by decrementing it by a preset value β higher than zero, and updates the re-determined value of the edge threshold stored in the storage medium 7a to the corrected value of the edge threshold in step S90 (see FIG. 8).

Next, in step S100, the ECU 7 determines whether to correct the re-determined value of the edge threshold in step S80 or the corrected value of the edge threshold in step S90 based on the value of the parameter indicative of the magnitude of variations in the light-intensity distribution calculated in step S30. The ECU 7 corrects or maintains the re-determined value of the edge threshold in step S80 or the corrected value of the edge threshold upon determining to correct the re-determined value of the edge threshold or the corrected value of the edge threshold based on a result of the determination in step S100.

In order to simply describe the operation in step S100, it is assumed that the re-determined value of the edge threshold has not been corrected in step S90.

At that time, the ECU 7 compares the value of the parameter indicative of the magnitude of variations in the light-intensity distribution with each of a value X and a value Y that is higher than the first value X.

Figure 9:
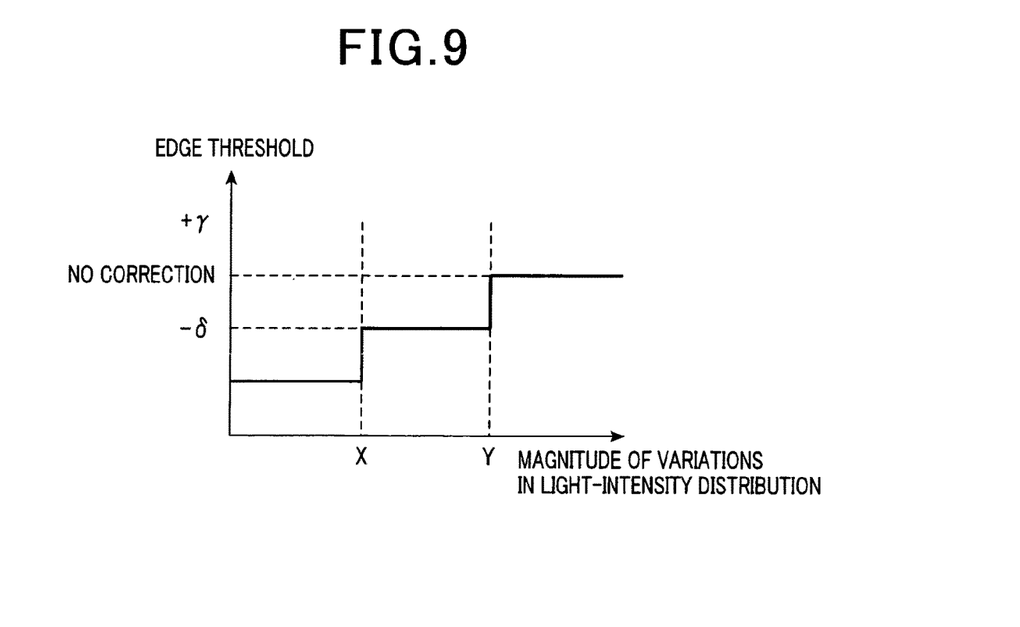
FIG. 9 is a view schematically illustrating how to correct the re-determined value of the edge threshold based on a value of a parameter indicative of a magnitude of variations in the light-intensity distribution according to the first embodiment.

As a result of the comparison, if it is determined that the value of the parameter indicative of the magnitude of variations in the light-intensity distribution is equal to or lower than the value X, the ECU 7 corrects the re-determined value of the edge threshold in step S80 by decrementing it by a preset value δ higher than zero, and updates the re-determined value of the edge threshold stored in the storage medium 7a to, the corrected value of the edge threshold in step S100 (see FIG. 9).

Otherwise, if it is determined that the value of the parameter indicative of the magnitude of variations in the light-intensity distribution is higher than the value X and lower than the value Y, the ECU 7 maintains the re-determined value of the edge threshold in step S80 without correcting it in step S100 (see FIG. 9).

Otherwise, if it is determined that the value of the parameter indicative of the magnitude of variations in the light-intensity distribution is equal to or higher than the value Y, the ECU 7 corrects the re-determined value of the edge threshold in step S80 by incrementing it by a preset value γ higher than zero, and updates the re-determined value of the edge threshold stored in the storage medium 7a to the corrected value of the edge threshold in step S100 (see FIG. 9).

If the re-determined value of the edge threshold has been corrected in step S90, the corrected value of the edge threshold is re-corrected in step S100 as is the case in the re-determined value of the edge threshold.

After completion of the operation in step S100, the ECU 7 returns to step S10, and carries out the operations in steps S10 to S100 based on a current frame image captured from the camera 3. In other words, the ECU 7 repeatedly carries out the operations in steps S10 to S108 each time a digital frame image is captured and outputted from the camera 3 as a current frame image.

As described above, the lane-marker recognition system 1 according to the first embodiment is configured to re-determine a value of the edge threshold based on the lane-marker intensity information indicative of the light intensity of the region of at least one lane marker.

That is, for example, even if the state of the lane markers marked on the road ahead of the motor vehicle MV, such as the luminance of the lane markers, varies depending on the state of the road ahead of the motor vehicle MV, the state (for example, the orientation) of light (sunlight and/or illumination light) to the road and its circumference, the weather condition around the road, and the like, it is possible to adjust the edge threshold based on the actually obtained light intensity of the region of each of the lane markers ahead of the motor vehicle MV. This achieves, as a first technical effect, an improved accuracy of recognizing edges of lane markers marked on a road ahead of the motor vehicle MV with a reduced impact from the variations set forth above.

The lane-marker recognition system 1 according to the first embodiment is also configured to correct a value of the edge threshold by reducing it if the air-to-road light-intensity ratio is relatively high for example when a current frame image is taken in a scene with severe backlight. Thus, if no correction were carried out although a corresponding current frame image were taken in a scene with severe backlight, reflections on the road ahead of the motor vehicle MV due to the backlight would reduce the contrast of lane markers marked on the road. This would make it difficult to recognize the lane markers.

However, the lane-marker recognition system 1 according to the first embodiment corrects the value of the edge threshold by reducing it if a current frame image is taken in a scene with severe backlight. The lane-marker recognition system 1 therefore facilitates, as a second technical effect, recognition of lane markers.

The lane-marker recognition system 1 according to the first embodiment is further configured to correct a value of the edge threshold by increasing it if the air-to-road light-intensity ratio is relatively low for example when a current frame image of a snowy road ahead of the motor vehicle MV is taken by the camera 3. Thus, if no correction were carried out although a current frame image of the snowy road were taken, another marker, such as tracks on the snowy road, would be falsely recognized as lane markers because snow would cover lane markers on the snowy road.

However, the lane-marker recognition system 1 according to the first embodiment corrects the value of the edge threshold by increasing it if a current frame image of a snowy road is taken. The lane-marker recognition system 1 therefore prevents, as a third technical effect, such false recognition.

The lane-marker recognition system 1 according to the first embodiment is configured to correct a value of the edge threshold by reducing it if the value of the parameter indicative of the magnitude of variations in the light-intensity distribution of the road ahead of the motor vehicle MV is relatively low. This reduces, as a fourth technical effect, failure to recognize edges of lane markers while preventing false recognition of another mark as lane markers because the magnitude of variations in the light-intensity distribution of the road ahead of the motor vehicle MV.

The lane-marker recognition system 1 according to the first embodiment is configured to correct a value of the edge threshold by increasing it if the value of the parameter indicative of the magnitude of variations in the light-intensity distribution of the road ahead of the motor vehicle MV is relatively high. This prevents, as a fifth technical effect, false recognition of another mark as lane markers.

Second Embodiment

A lane-marker recognition system according to the second embodiment of the present disclosure will be described hereinafter with reference to FIG. 10.

The structure and/or functions of the lane-marker recognition system according to the second embodiment are different from the lane-marker recognition system 1 by the following points. So, the different points will be mainly described hereinafter.

Figure 10:
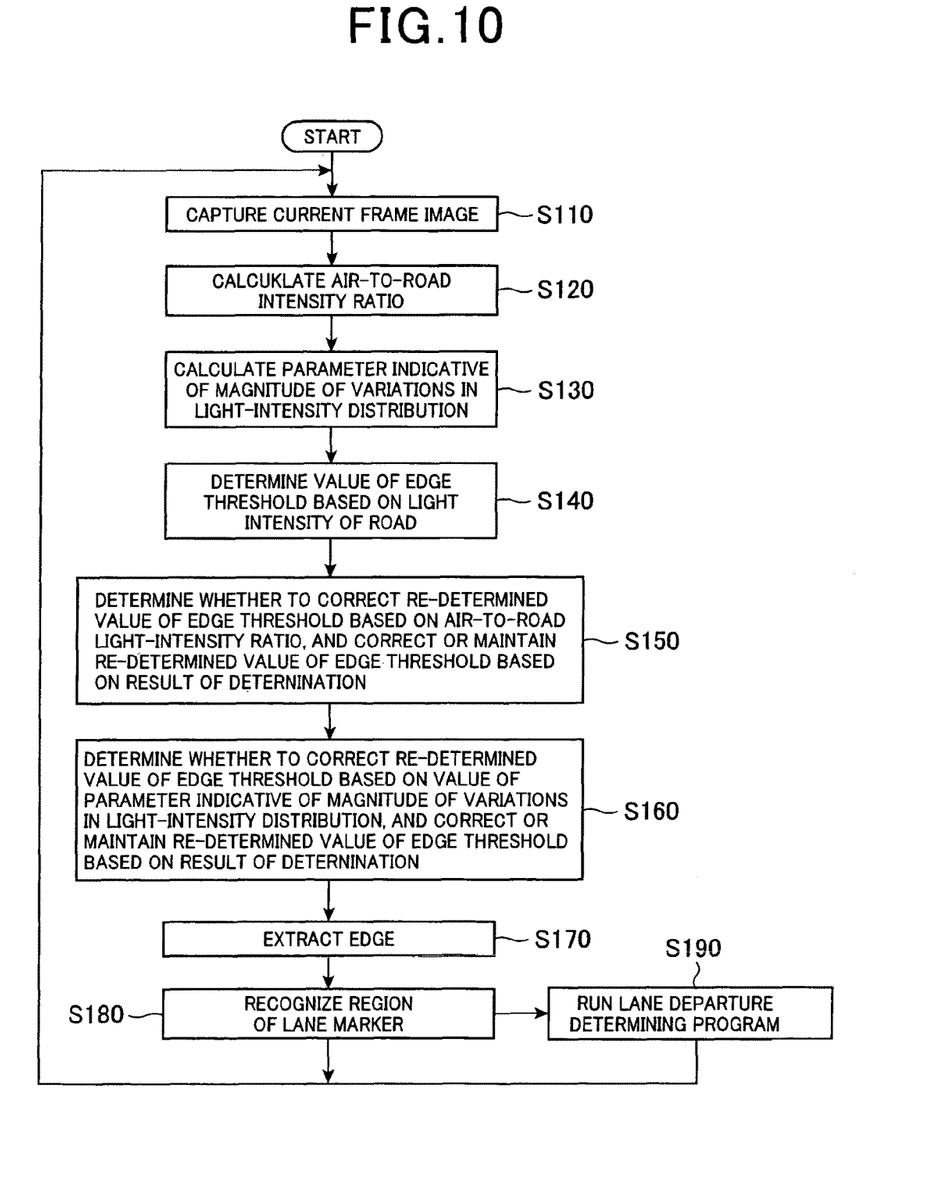
FIG. 10 is a flowchart schematically illustrating a lane-marker recognition task to be run by the image-processing ECU according to a second embodiment of the present disclosure.

The ECU 7 is designed to run a lane-marker recognition program PR1A illustrated in FIG. 10 in place of the lane-marker recognition program PR1 illustrated in FIG. 2.

When launching the lane-marker recognition program PR2, the ECU 7 carries out operations in step S110 to S130 identical to the operations in steps S10 to S30, respectively.

Next, the ECU 7 determines a value of the edge threshold based on the light intensity of road calculated in step S120 in step S140.

For example, like the first embodiment, the ECU 7 according to the second embodiment stores therein the map M1 representing a variable of the edge threshold as a function of a variable (parameter) of the light intensity of road.

Specifically, in step S140, the ECU 7 references the map M1 using the value of the light intensity of road calculated in step S120 as a key to thereby extract a value of the edge threshold corresponding to the calculated value of the light intensity of road. Then, the ECU 7 stores the determined value of the edge threshold in the storage medium 7a.

Following the operation in step S140, the ECU 7 determines whether to correct the value of the edge threshold determined in step S140 based on the air-to-road light-intensity ratio calculated in step S120, and corrects or maintains the value of the edge threshold determined in step S140 upon determining to correct the value of the edge threshold based on a result of the determination in step S150. A specific operation in step S150 is identical to that in step S90 according to the first embodiment.

After completion of the operation in step S150, the ECU 7 determines whether to correct the value of the edge threshold determined in step S140 or the corrected value of the edge threshold in step S150 based on the value of the parameter indicative of the magnitude of variations in the light-intensity distribution calculated in step S130. The ECU 7 corrects or maintains the value of the edge threshold determined in step S140 or the corrected value of the edge threshold in step S150 upon determining to correct the value of the edge threshold determined in step S140 or the corrected value of the edge threshold in step S150 based on a result of the determination in step S160. A specific operation in step S160 is identical to that in step S100 according to the first embodiment.

Thereafter, in step S170, the ECU 7 extracts edges of lane markers on the road ahead of the motor vehicle MV in the current frame image in the same approach illustrated in step S50 using the value of the edge threshold determined in step S140 or the corrected value of the edge threshold in step S150 and/or S160.

Following the operation in step S170, the ECU 7 carries out a lane-marker recognition operation identical to that in step S60 using the edges extracted in step S170 in step S180, thus recognizing at least one region (lane-marker region) surrounded by the lines of the at least one pair as a region of at least one lane marker (white line) in step S180. As described above, the ECU 7 (or an alternative ECU connected to the ECU 7) runs the lane departure determining program PR2 based on the recognized at least one lane marker in step S190.

After completion of the operation in step S190, the ECU 7 returns to step S110, and carries out the operations in steps S110 to S190 based on a current frame image captured from the camera 3. In other words, the ECU 7 repeatedly carries out the operations in steps S110 to S190 each time a digital frame image is captured and outputted from the camera 3 as a current frame image.

As described above, the lane-marker recognition system according to the second embodiment is configured to correct a value of the edge threshold by changing it depending on whether the air-to-road light-intensity ratio is relatively high or low in the same approach as the lane-marker recognition system 1.

Thus, the lane-marker recognition system according to the second embodiment achieves the second and third technical effects like the lane-marker recognition system 1.

In addition, the lane-marker recognition system according to the second embodiment is configured to correct a value of the edge threshold by changing it depending on whether the value of the parameter indicative of the magnitude of variations in the light-intensity distribution of the road ahead of the motor vehicle MV is relatively low or high in the same approach as the lane-marker recognition system 1.

Thus, the lane-marker recognition system according to the second embodiment achieves the fourth and fifth technical effects like the lane-marker recognition system 1 according to the first embodiment.

The present disclosure is not limited to the aforementioned embodiments, and can be modified within the scope of the present disclosure.

For example, the lane-marker recognition system 1 can be designed to execute any one of the operations in steps S90 and S100. This modification achieves a pair of the second and third technical effects or a pair of the fourth and fifth technical effects set forth above. In addition, the lane-marker recognition system 1 can be designed to execute no operations in steps S90 and S100. This modification can achieve the first technical effect set forth above.

In step S100, the ECU 7 of the lane-marker recognition system 1 is programmed to compare the value of the parameter indicative of the magnitude of variations in the light-intensity distribution with each of the value X and the value Y, but the present disclosure is not limited thereto.

Specifically, the ECU 7 can be programmed to compare the value of the parameter indicative of the magnitude of variations in the light-intensity distribution with each of three or more reference values different from each other. This modification can correct the re-determined value of the edge threshold in step S80 or the corrected value of the edge threshold in step S90 with high resolution. In addition, in step S100, the ECU 7 can be programmed to correct the re-determined value of the edge threshold in step S80 or the corrected value of the edge threshold in step S90 by increasing it with increase in the value of the parameter indicative of the magnitude of variations in the light-intensity distribution.

The lane-marker recognition system according to the second embodiment can be designed to execute any one of the operations in steps S150 and S160. This modification can achieve a pair of the second and third technical effects or a pair of the fourth and fifth technical effects set forth above.

In step S50 according to the first embodiment or step S170 according to the second embodiment, the ECU 7 can be programmed to compare each of the intensity values of all pixels on each of the plurality of scan lines SL with the value of the edge threshold to thereby extract edges of lane markers.

The ECU 7 according to the first embodiment is programmed to extract edges of lane markers on the road ahead of the motor vehicle MV in the current frame image based on the value of the edge threshold stored in the storage medium 7a, which has been re-determined or corrected for the previous frame image. However, the present disclosure is not limited to the structure.

Specifically, the ECU 7 according to the first embodiment can be programmed to extract edges of lane markers on the road ahead of the motor vehicle MV in the current frame image based on the value of the edge threshold stored in the storage medium 7a, which has been re-determined or corrected for the current frame image. In other words, the operations in steps S50 and S60 can be located after the operation in step S100.

This modification can more improve the accuracy of recognizing edges of lane markers marked on a road ahead of the motor vehicle MV.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A lane-marker recognition system installed in a vehicle, comprising:

an image pickup unit that picks up an image of a target region including a road ahead of the vehicle;

a light-intensity detecting unit that detects a change in a light intensity of the target region in the picked-up image;

a lane-marker recognizing unit that compares the change in the light intensity of the target region in the picked-up image with a predetermined threshold value, and recognizes a region of at least one lane marker in the target region based on a result of the comparison, the at least one lane marker being formed on the road; and a re-determining unit that re-determines the threshold value based on a light intensity of the recognized region of the at least one lane marker;

wherein the target region includes the road ahead of the vehicle and a part of air above the vehicle, the lane-marker recognition system further comprising:

an intensity ratio calculating unit that calculates a ratio of a light intensity of a first area in the picked-up image to a light intensity of a second area in the picked-up image, the first area corresponding to the part of air, the second area corresponding to a part of the road ahead of the vehicle; and a first threshold correcting unit that compares the calculated ratio with a preset first value, and corrects the threshold value re-determined by the re-determining unit by reducing the threshold value if the calculated ratio is equal to or higher than the preset first value.

2. The lane-marker recognition system according to claim 1, wherein the first threshold correcting unit compares the calculated ratio with a preset second value lower than the preset first value, and corrects the threshold value re-determined by the re-determining unit by increasing the threshold value if the calculated ratio is equal to or lower than the preset second value.

3. A lane-marker recognition system installed in a vehicle, comprising:

an image pickup unit that picks up an image of a target region including a road ahead of the vehicle;

a light-intensity detecting unit that detects a change in a light intensity of the target region in the picked-up image;

a lane-marker recognizing unit that compares the change in the light intensity of the target region in the picked-up image with a predetermined threshold value, and recognizes a region of at least one lane marker in the target region based on a result of the comparison, the at least one lane marker being formed on the road;

a re-determining unit that re-determines the threshold value based on a light intensity of the recognized region of the at least one lane marker;

an intensity distribution calculating unit that calculates a value of a parameter indicative of a magnitude of variations in a light-intensity distribution of the road ahead of the vehicle in the picked-up image; and a second threshold correcting unit that compares the calculated value of the parameter with a first preset value, and corrects the threshold value re-determined by the re-determining unit by increasing the threshold value if the calculated value of the parameter is equal to or higher than the preset first value.

4. The lane-marker recognition system according to claim 3, wherein the second threshold correcting unit compares the calculated value of the parameter with a second preset value lower than the first preset value, and corrects the threshold value re-determined by the re-determining unit by reducing the threshold value if the calculated value of the parameter is equal to or lower than the preset second value.

5. A lane-marker recognition system installed in a vehicle, comprising:
an image pickup unit that picks up an image of a target region including a road ahead of the vehicle;
a light-intensity detecting unit that detects a change in a light intensity of the target region in the picked-up image;
a lane-marker recognizing unit that compares the change in the light intensity of the target region in the picked-up image with a predetermined threshold value, and recognizes a region of at least one lane marker in the target region based on a result of the comparison, the at least one lane marker being formed on the road;
an intensity ratio calculating unit that calculates a ratio of a light intensity of a first area in the picked-up image to a light intensity of a second area in the picked-up image, the first area corresponding to the part of air, the second area corresponding to a part of the road ahead of the vehicle; and
a threshold correcting unit that compares the calculated ratio with a preset first value, and corrects the threshold value by reducing the threshold if the calculated ratio is equal to or higher than the preset first value.

6. The lane-marker recognition system according to claim 5, wherein the threshold correcting unit compares the calculated ratio with a preset second value lower than the preset first value, and corrects the threshold re-determined by the re-determining unit by increasing the threshold value if the calculated ratio is equal to or lower than the preset second value.

7. A lane-marker recognition system installed in a vehicle, comprising:
an image pickup unit that picks up an image of a target region including a road ahead of the vehicle;
a light-intensity detecting unit that detects a change in a light intensity of the target region in the picked-up image;
a lane-marker recognizing unit that compares the change in the light intensity of the target region in the picked-up image with a predetermined threshold value, and recognizes a region of at least one lane marker in the target region based on a result of the comparison, the at least one lane marker being formed on the road;
an intensity distribution calculating unit that calculates a value of a parameter indicative of a magnitude of variations in a light-intensity distribution of the road ahead of the vehicle in the image picked up by the image pickup unit; and
a threshold correcting unit that compares the calculated value of the parameter with a first preset value, and corrects the threshold value by increasing the threshold value if the calculated value of the parameter is equal to or higher than the preset first value.

8. The lane-marker recognition system according to claim 7, wherein the second threshold correcting unit compares the calculated value of the parameter with a second preset value lower than the first preset value, and corrects the threshold value by reducing the threshold value if the calculated value of the parameter is equal to or lower than the preset second value.

* * * * *